United States Patent [19]

Surjaatmadja

[11] Patent Number: 5,226,445
[45] Date of Patent: Jul. 13, 1993

[54] VALVE HAVING CONVEX SEALING SURFACE AND CONCAVE SEATING SURFACE

[75] Inventor: Jim B. Surjaatmadja, Duncan, Okla.
[73] Assignee: Halliburton Company, Duncan, Okla.
[21] Appl. No.: 878,798
[22] Filed: May 5, 1992
[51] Int. Cl.⁵ .............................................. F16K 15/06
[52] U.S. Cl. .................... 137/516.29; 137/542; 137/902
[58] Field of Search .......... 137/516.27, 516.29, 137/902, 533.17

[56] References Cited

U.S. PATENT DOCUMENTS

| | | | |
|---|---|---|---|
| 1,733,180 | 10/1929 | Biedermann | 137/902 X |
| 1,940,999 | 12/1933 | Ferlin | 137/902 X |
| 2,025,296 | 12/1935 | McIntyre | 137/533.17 |
| 2,318,773 | 5/1943 | Goetz | 137/902 X |
| 4,860,995 | 8/1989 | Rogers | 137/516.29 X |
| 5,073,096 | 12/1991 | King | 137/516.29 X |
| 5,088,521 | 2/1992 | Johnson | 137/516.29 |

Primary Examiner—Robert G. Nilson
Attorney, Agent, or Firm—Stephen R. Christian; Lawrence R. Watson

[57] ABSTRACT

A valve includes a seat surrounding an orifice having a concave seating surface and a plug having an annular sealing surface for sealingly contacting the seat. The sealing surface is convex and creates a convex discontinuity in an axially-extending, cross-sectional profile of the plug. The sealing surface retains approximately the same amount of contact area with the seating surface when the plug is misaligned or tilted with respect to the seat as when aligned.

12 Claims, 3 Drawing Sheets

VALVE HAVING CONVEX SEALING SURFACE AND CONCAVE SEATING SURFACE

BACKGROUND OF THE INVENTION

This invention relates to valves and more particularly relates to a valve having an improved plug sealing surface and seat.

Valves have been used to control fluid flow for many years. The use of a ball to seal a conically-shaped orifice in a valve, such as the check valves used with chemical injection pumps, is also known. However, there are no plug-guided valves known to the present inventor which use a plug having a curved or radiused sealing surface, or which use a seat having a curved or radiused surface. Rather, the present plug-guided valves use a conically-shaped plug sealing surface and a conically-shaped seat. By "plug-guided", as used herein, is meant a plug having integral structure which guides the plug to and from contact with the seat in such a manner that the plug retains generally the same axial orientation with respect to the seat and that the plug has a defined sealing surface (such as the conically-shaped sealing surface previously mentioned) which engages the seat.

There are problems with the conically-shaped surfaces. For example, if the plug is not perfectly aligned with the seat, the mating cones do not meet properly and, rather than making a continuous contact along the full axial length and around the full circumference of the mating conical surfaces, the cones meet at three discrete contact points (assuming the cones are perfectly shaped), as illustrated in FIG. 1. This distributes all of the loading between the plug and the seat on the discrete contact points which can deform the plug and/or seat and greatly reduce the life of the plug and/or seat. This is particularly likely as the differential pressure across the valve is increased and the diameter of the valve is increased to increase flow capacity, as has been the case with inlet and outlet valves used with high pressure (as much as 20,000 psi) fracturing fluid pumps in the oil industry. As the pressure differential and plug diameter increase, the load exerted on the seat by the plug increases, and any decrease in the contact area between the plug and seat increases the loading per unit of contact area. At the present time, the plugs and seats used with large, high pressure fracturing fluid pumps are often replaced after each use because of deformation created by misalignment and loading of the conically-shaped plug sealing surfaces and seats. This is such a well-known problem that the valves used with fracturing fluid pumps often have stems extending from both the upstream side and the downstream side of the plug to guide and control the alignment of the plug with the seat as closely as possible (and thereby maximize contact area between the plug and seat when the valve is closed). In spite of the use of upstream and downstream stems and guides, there is almost always some misalignment and diminished contact area between the conically shaped plugs and seats.

Therefore, there is a need for a valve having a guided plug which will provide full contact between the plug sealing surface and seat when the plug sealing surface and seat are misaligned in order to keep the loading per unit of contact area as low as possible. There is a need for such a valve which will have contact between the plug sealing surface and seat of approximately the same area regardless of the degree of misalignment between the plug and seat. There is also a need for such a valve which does not need to be guided on both the upstream and downstream sides of the plug.

SUMMARY OF THE INVENTION

The present invention is contemplated to overcome the foregoing deficiencies to meet the above-described needs. In accomplishing this, the present invention provides a novel and improved valve, plug, and seat.

The valve includes a valve body having an orifice; a seat surrounding the orifice; a plug having an annular sealing surface for sealingly contacting the seat; and actuator means for moving the plug and sealing surface into and out of contact with the seat. The seat defines an axis in the valve body. The sealing surface is convex in an axially-extending cross-sectional profile of the plug and creates a convex discontinuity in the axially-extending cross-sectional profile of the plug.

The seat has a seating surface which may be concave in an axially-extending cross-sectional profile of the seat. In a preferred embodiment, the radius of curvature of the sealing surface is larger than the radius of curvature of the seating surface. A resilient annular insert may be connected to the plug adjacent the sealing surface beyond the radial extremity of the sealing surface for resiliently and sealingly contacting the seat. Preferably, the insert has an outside surface which is convex in an axially-extending cross-section of the plug. The preferred outside surface of the insert has a radius of curvature larger than the radius of curvature of the sealing surface.

It is an advantage of the present invention to provide a valve having a guided plug which will provide full contact between the plug sealing surface and seat when the axes of the plug sealing surface and seat are misaligned, e.g., when the axis of the plug is cocked or skewed with respect to the axis of the seat.

It is an advantage of the present invention to provide such a valve which will have approximately the same contact area between the plug sealing surface and seat when the axis of the plug is tilted approximately 5° to 10° with respect to the axis of the seat.

It is an advantage of the present invention to provide a valve plug having a sealing surface which provides full circular contact with the seat when the plug is misaligned with the seat.

It is an advantage of the present invention to provide such a valve which does not need to be guided on both the upstream and downstream sides of the plug.

BRIEF DESCRIPTION OF THE DRAWINGS

The present invention will be better understood by reference to the example of the following drawings.

DETAILED DESCRIPTION OF THE PREFERRED EMBODIMENTS

FIGS. 2-7 present embodiments of the valve 20 of the present invention. Although the valve is described as used with high pressure fracturing fluid pumps, it is intended to be understood that the invention may be used with virtually any valve having a plug 22 which seals against an annular seat 24 surrounding an orifice 26.

Figure 2:
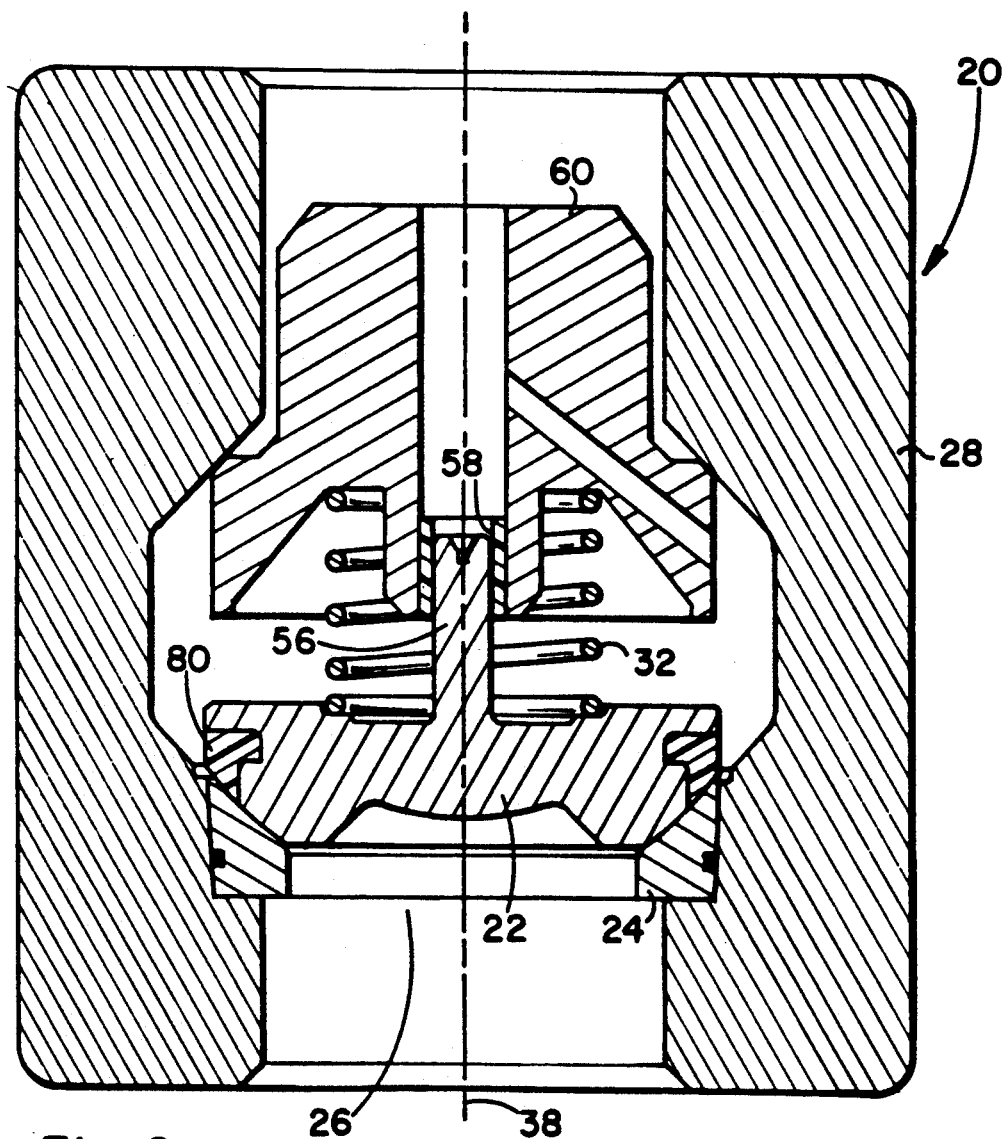
FIG. 2 is an axial, cross-sectional view of an embodiment of a valve of the present invention.

Referring to the example of FIG. 2, the preferred valve 20 includes a valve body 28 having an orifice 26, a seat 24 surrounding the orifice 26, a plug 22 having an annular sealing surface 30 (best seen in FIG. 3) for sealingly contacting the seat 24, and actuator means 32 for moving the sealing surface 30 into and out of contact with the seat 24. The seat 24 and orifice 26 (which extends through the orifice defined by the annular seat 24) define an axis 38 in the valve body 28. For purposes of defining the relationships between the components described herein, axial is defined as a direction about parallel to or coaxial with the axis 38; and radial is defined as being a direction about perpendicular to the axis 38.

Figure 3:
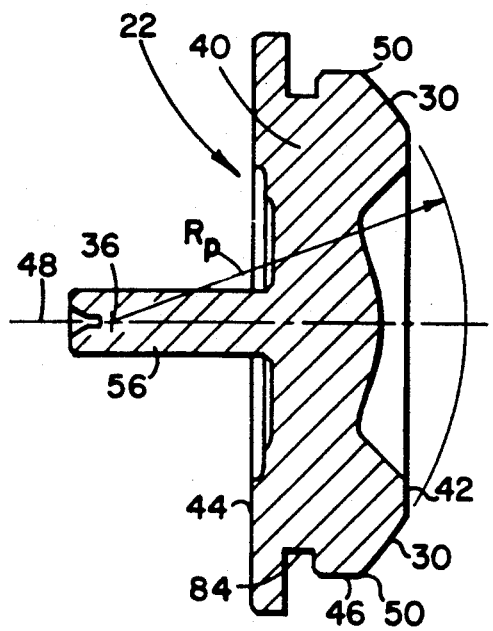
FIG. 3 is an axial, cross-sectional view of an embodiment of a plug of the present invention.

Referring to FIG. 3, in the preferred embodiment, the sealing surface 30 is convex when viewed in an axially-extending cross-sectional profile of the plug 22. The sealing surface 30 creates a convex discontinuity in the cross-sectional profile of the plug 22. Although providing a sealing surface 30 having virtually any radius of curvature $R_p$ will provide improved sealing and increased contact area between the sealing surface 30 and seat 24 when the plug 22 is not perfectly aligned with the seat 24, in the preferred embodiment the sealing surface 30 has a single radius of curvature $R_p$, i.e., there is a single radial center point 36 defining the radius of curvature $R_p$ of the sealing surface. It is contemplated that having a single radius of curvature $R_p$ for the entire sealing surface 30 will allow the plug to tilt approximately 5°-10° with respect to the axis 38 of the seat 24 while retaining approximately the same amount of surface contact between the sealing surface 30 and the seat 24.

Referring to FIG. 3, in the preferred embodiment, the plug includes a generally disc-shaped portion 40. The disc-shaped portion 40 has a first side 42 facing the seat 24, a second side 44, and a peripheral edge 46 extending between the first and second sides 42, 44. The annular sealing surface 30 extends between the first side 42 and the edge 46. The preferred sealing surface 30 therefore forms an annulus or ring which is spaced away from the central axis 48 of the plug 22. The sealing surface 30 could be formed as part of a continuously curved surface (such as defined by the arc of radius of curvature $R_p$ in FIG. 3) extending within the outer circumference 50 of the sealing surface 30, although the disc-shaped plug 22 having an annular sealing surface 30 is preferred as being lighter and more economical.

Figure 7:
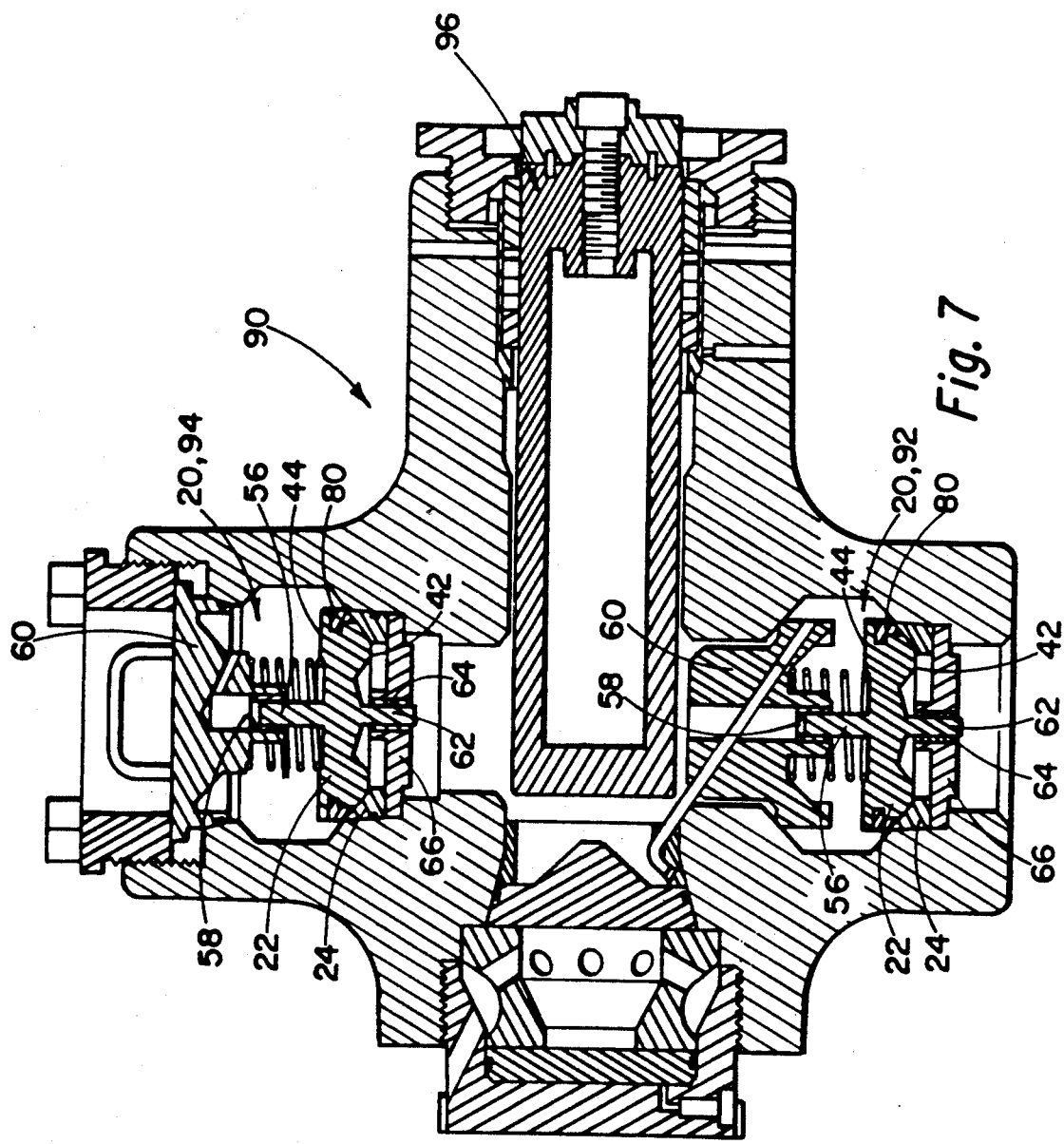
FIG. 7 is a cross-sectional view of a cylinder of a fracturing pump utilizing two valves of the present invention.

Referring to the example of FIGS. 3 and 7, in the preferred valve 20 the plug 22 includes a stem 56 extending from the plug 22 and the valve 20 includes a guideway 58 for receiving the stem and guiding the plug 22 and sealing surface 30 into and out of contact with the seat 24. Preferably, the stem 56 extends axially from the second side 44 of the plug 22, although a stem may extend from either side 42, 44 of the plug 22, or may extend from both sides 42, 44, as exemplified in FIG. 7. The preferred stem 56 is an integral component of the plug 22. The stem 56 may be of virtually any shape, axial length, and diameter, e.g., the stem may be approximately the same diameter as the plug 22, thereby forming a generally cylindrical plug 22. The stem may also be a hollow cylinder (not illustrated) with a guide extending inside the stem to guide the plug 22. In the prototype valve 20, the stem 56 is of smaller diameter than the plug 22 and the guideway 58 is formed in a guideway member 60 which is designed to be fastened, machined, or otherwise fixed in the valve body 28. Referring to the example of FIG. 7, if a second stem 62 is provided, a second guideway 64 and second guideway member 66 are positioned in the valve body on the first side 42 of the plug 22. The guideway(s) 56,58 may be an integral component of the valve body 28, e.g., machined, formed, or cast in the valve body. The preferred guideway(s) 56,58 are formed in removable and replaceable guideway members 60,66 to facilitate maintenance and repair.

Figure 4:
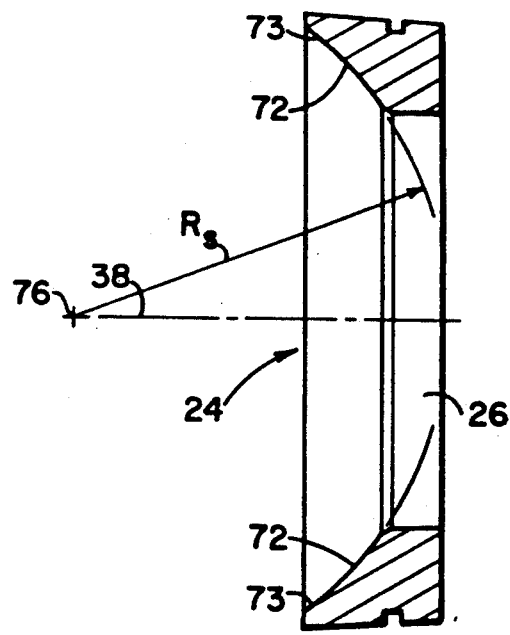
FIG. 4 is an axial, cross-sectional view of an embodiment of a seat of the present invention.

Referring to the example of FIG. 4, in the preferred embodiment, the annular seat 24 has a concave seating surface 72 when viewed in an axially-extending cross-sectional profile. Although the seating surface 72 may be conical or may be of virtually any radius of curvature $R_s$ and achieve many of the advantages and benefits of the present invention, preferably the radius of curvature $R_s$ of the seating surface 72 is smaller than the radius of curvature $R_p$ of the sealing surface 30. Referring to the example of FIG. 5, when the sealing surface radius of curvature $R_p$ is greater than the seating surface radius of curvature $R_s$, the plug sealing surface 30 initially contacts the seating surface 72 at the outside edge 73 of the sealing surface 30 creating a circumferential line of contact between the sealing surface 30 and seating surface 72 and also creating a gap 74 between the sealing surface 30 and the seat 24. The size of the gap 74 increases towards the axial center of the plug 22 and seat 24. When the plug 22 is loaded, e.g., when a large pressure differential is applied across the closed plug 22 and seat 24, the plug 22 will buckle or bend slightly about its axial center forcing the sealing surface 30 into contact with the full surface area of the seating surface 72 and closing the gap 74; thereby increasing the contact area between the sealing surface 30 and seating surface 72, distributing the loading between the plug 22 the seat 24 on a larger surface area, and decreasing the loading per unit of contact area. As previously mentioned, this decreased loading reduces deformation of the sealing surface 30 and seating surface 72 and increases the life of the same. It is contemplated that making the radius of curvature $R_p$ of the plug 22 larger than the radius of curvature $R_s$ of the seat 24 will consistently and repeatably provide a larger contact area between the sealing surface 30 and seating surface 72 than other configurations (such as when $R_p$ is equal to or smaller than $R_s$) because it will ensure that the contact area will be larger than the circumferential line contact area which can be created by the other configurations. For example, the inventor has found that if the plug radius of curvature $R_p$ is equal to the seat radius or curvature $R_s$ such that the sealing surface 30 makes initial contact with the full surface area of the seating surface 72, when the plug 22 is subjected to high pressure loading it buckles about its axial center which pulls the sealing surface 30 away from the outer edge 73 of the seating surface 72 and creates a circumferential line contact area between the sealing surface 30 and seating surface 72 which is located towards the axial center of the plug 22 and seat 24, thus reducing the contact area between the sealing surface 30 and seating surface 72. If the plug radius of curvature $R_p$ is less than the seat radius of curvature $R_s$, the sealing surface 30 will create a circumferential line contact area with the seating surface 72 both before and after loading of the plug 22.

For the same reasons previously discussed with the sealing surface 30, the preferred seating surface 72 has a single radius of curvature $R_s$, i.e., there is a single radial center point 76 defining the radius of curvature $R_s$. The seat 24 should be securely fastened in the valve body 28 and may be machined, cast, or otherwise formed in the valve body 28. Preferably, the seat 24 is a separate and distinct component which may be removed and replaced from the valve body 28 to facilitate maintenance and repair.

Figure 1:
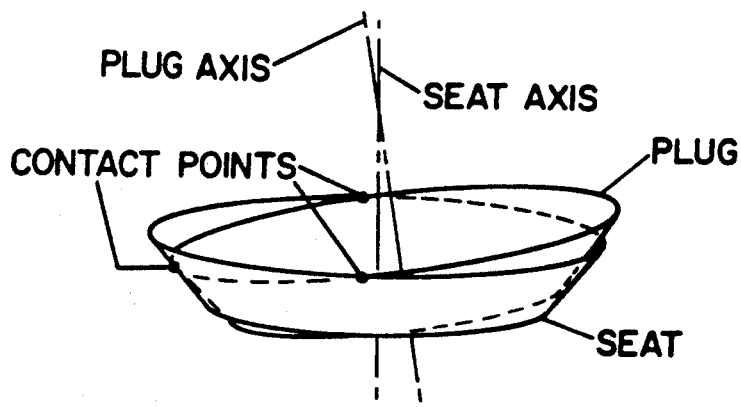
FIG. 1 is a schematic view of a prior, conically-shaped plug and seat which illustrates the problems created by misalignment of the conically-shaped plug and seat.
Figure 5:
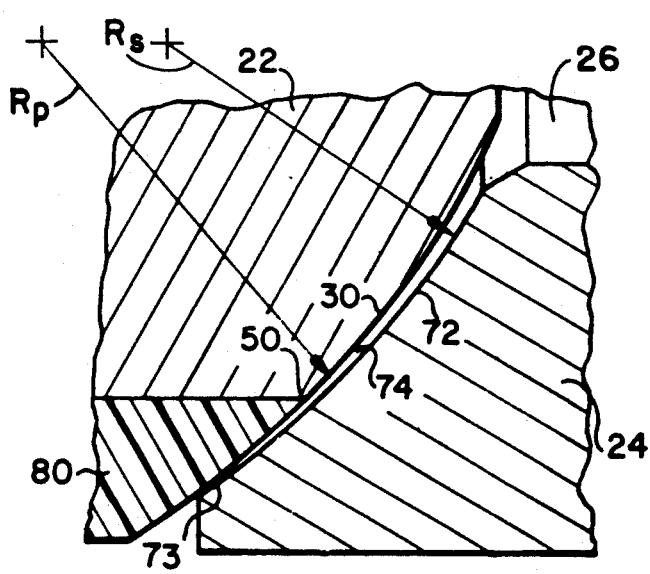
FIG. 5 is an enlarged cross-sectional view of the contact between the plug and seat of the present invention.
Figure 6:
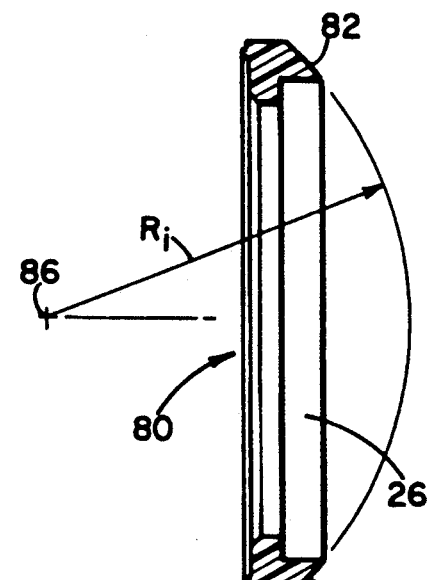
FIG. 6 is an axial, cross-sectional view of an embodiment of an insert of the present invention.

Referring to the example of FIGS. 1, 5, and 6, the preferred valve includes a resilient annular insert 80 connected to the plug 22 adjacent the sealing surface 30 and beyond the radial extremity or outer circumference 50 of the sealing surface 30. The insert 80 has an outside surface 82 for resiliently and sealingly contacting the seat 24. The outside surface 82 of the preferred insert 80 is convex when viewed in an axially-extending cross-section of the plug 22 and insert 80. Preferably, the outside surface 82 of the insert 80 has a radius of curvature $R_i$ larger than the radius of curvature $R_p$ of the sealing surface. For the same reasons previously discussed with the sealing surface 30, the preferred insert 80 has a single radius of curvature $R_i$, i.e., there is a single radial center point 86 defining the radius of curvature $R_i$. The preferred insert 80 is connected to the peripheral edge 46 of the plug 22 utilizing circumferential groove 84 in the peripheral edge 46 of the plug 22. The insert 80 is shaped to fit into the groove 84.

In the prototype valve 20, which functions as a one-way valve or check valve, the outside surface 82 of the insert 80 contacts the seating surface 72 before the sealing surface 30. The prototype valve 20 uses the insert 80 to create an initial seal and pressure drop across the plug 22 and seat 24, after which the full pressure drop across the plug 22 is then used to force the sealing surface 30 into contact with the seating surface 72. If the insert 80 is used with the valve 20, the seating surface 72 should be concave to minimize the clearance or space between the sealing surface 30 and seating surface 72 adjacent the insert, as the large pressure drops encountered across some types of valves, particularly the valves used with fracturing pumps, can force the insert 80 into a space between the sealing surface 30 and seating surface 72, and may even pull the insert 80 from the plug 22 if the space is large enough.

The actuator means 32 may be a spring, pneumatically-powered actuator, hydraulically-powered actuator, motor-driven actuator, or other well-known means for powering a valve plug. In the prototype valve 20, the actuator means 32 is a spring which biases the plug 22 against the seat 24. In the prototype valve 20, the spring 32 is not strong enough to create a fluid-tight seal between the plug 22 and seat 24. The spring 32 is used to bias the plug 22 and insert 80 into contact with the seat 24. The insert 80, which is preferably a rubber-like material, is used to create the initial seal across the plug 22 and seat 24 so that the full pressure drop available in the valve body may be used to force the sealing surface 30 into fluid-tight contact with the seating surface 72.

The preferred valve 20 is a poppet-type valve in which the plug 22 is guided into contact with the seat 24 using stem 56 and guideway 58, as previously discussed. Plug 22 retains essentially the same axial orientation with respect to the seat 24 so that essentially the same sealing surface 30 contacts the seating surface 72 each time the valve 20 is closed and the plug 22 seated on the seat. In other words, the plug 22 retains approximately the same axial alignment with the seat 24 at all times. The invention cures the problems created by the small amount of misalignment or tilt between the axis 48 of the plug and the axis 38 of the seat, which is to be expected as the plug 22 opens and closes.

Referring to the example of FIG. 7, as previously mentioned, the prototype valve 20 is used with a hydraulic fracturing pump 90. FIG. 7 is a cross-sectional view of one cylinder of the fracturing pump 90. Fracturing pumps typically have several cylinders. Each cylinder of the fracturing pump 90 uses two valves 20, one as an inlet valve 92 and one as an outlet valve 94. When the reciprocal piston 96 is moved out of the pump 90, it creates a vacuum inside the pump body which opens the inlet valve 92 and which pulls the plug 22 of the outlet valve 94 into its seat 24. When the reciprocal piston 96 moves into the body of the pump 90, the fluid pressure inside the pump body acts on the first side 42 of the plug 22 of the inlet valve 92 to force the plug 22 into the seat 24. Simultaneously, the fluid pressure created inside the pump body acts on the second side 44 of the plug 22 of the outlet valve 94 to force the plug open and allowing fluid to discharge through the outlet valve 94. This operation would be well-known to one skilled in the art in view of the disclosure contained herein. In the prototype pump 90, the plug 22 is 5.57 inches in diameter, the sealing surface 30 has a radius of curvature $R_p$ of 3.5 inches, the insert 80 is 5.68 inches in diameter, the outside surface 82 of the insert 80 has a radius of curvature $R_i$ of 3.733 inches, and the seating surface 72 has a radius of curvature $R_s$ of 3.46 inches. The prototype insert 80 is made of a rubber-like material, such as acid resistant polyurethane. The prototype valve plug 22 and seat 24 are made of metal, such as machined steel.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. A valve, comprising:
   a valve body having an orifice;
   a seat surrounding the orifice, the seat further defined as having a concave seating surface when viewed in an axially-extending cross-sectional profile of the plug, and the seat defining an axis in the valve body;
   a plug having an annular sealing surface for sealingly contacting the seat, the sealing surface being convex and creating a convex discontinuity in an axially-extending cross-sectional profile of the plug; actuator means for moving the sealing surface into and out of contact with the seat; and
   wherein the radius of curvature of the sealing surface is larger then the radius of curvature of the seating surface.

2. Valve of claim 1, comprising:
a resilient insert connected to the plug adjacent the sealing surface beyond the radial extremity of the sealing surface, the insert having an outside surface for resiliently and sealingly contacting the seat, the outside surface of the insert being convex in an axially-extending cross-sectional profile of the plug.

3. Valve of claim 2:
wherein the outside surface of the insert has a radius of curvature larger than the radius of curvature of the sealing surface.

4. Valve of claim 1 in which the plug comprises:
a generally disc-shaped portion, the disc-shaped portion having a first side facing the seat, a second side, and a peripheral edge extending between the first and second sides; and
wherein the annular sealing surface extends between the first side and the edge.

5. A valve, comprising:
a valve body having an orifice;
a seat surrounding the orifice, the seat further defined as having a concave seating surface when viewed in an axially-extending cross-sectional profile of the plug, and the seat defining an axis in the valve body;
a plug having a stem extending from the plug and having an annular sealing surface being convex in an axially-extending cross-sectional profile of the plug;
a guideway for receiving the stem and guiding the plug and sealing surface into and out of contact with the seat; actuator means for moving the plug and sealing surfaces into and out of contact with the seat; and
wherein the radius of curvature of the sealing surface is larger than the radius of curvature of the seating surface.

6. Valve of claim 5, comprising:
a resilient annular insert connected to the plug adjacent the sealing surface beyond the radial extremity of the sealing surface, the insert having an outside surface for resiliently and sealingly contacting the seat, the outside surface of the insert being convex in an axially-extending cross-sectional profile of the plug.

7. Valve of claim 6:
wherein the outside surface of the insert has a radius of curvature larger than the radius of curvature of the sealing surface.

8. Valve of claim 5 in which the plug comprises:
a generally disc-shaped portion, the disc-shaped portion having a first side facing the seat, a second side, and a peripheral edge between the first and second sides; and
wherein the annular sealing surface extends between the first side and the edge.

9. A plug and seat for use in a valve body having an orifice and an actuator for moving the plug into and out of contact with the seat, comprising:
a seat surrounding the orifice, the seat further defined as having a concave seating surface when viewed in an axially-extending cross-sectional profile of the plug, and the seat defining an axis in the valve body;
a plug having an annular sealing surface for sealingly contacting the seat, the sealing surface being convex and creating a convex discontinuity in an axially-extending cross-sectional profile of the plug; and
wherein the radius of curvature of the sealing surface is larger than the radius of curvature of the seating surface.

10. Valve of claim 9, comprising:
a resilient annular insert connected to the plug adjacent the sealing surface beyond the radial extremity of the sealing surface, the insert having an outside surface for resiliently and sealingly contacting the seat, the outside surface of the inset being convex in an axially-extending cross-sectional profile of the plug.

11. Valve of claim 10:
wherein the outside surface of the insert has a radius of curvature larger than the radius of curvature of the sealing surface.

12. Valve of claim 9 in which the plug comprises:
a generally disc-shaped portion, the disc shaped portion having a first side facing the seat, a second side, and a peripheral edge between the first and second sides; and
wherein the annular sealing surface extends between the first side and the edge.

* * * * *